US008896260B2

(12) United States Patent  (10) Patent No.: US 8,896,260 B2
Kuboe  (45) Date of Patent: Nov. 25, 2014

(54) POWER SUPPLY UNIT FOR PRESS MACHINE

(71) Applicant: Aida Engineering, Ltd., Sagamihara (JP)

(72) Inventor: Kazuhiro Kuboe, Sagamihara (JP)

(73) Assignee: Aida Engineering, Ltd., Kanagawa (JP)

(*) Notice: Subject to any disclaimer, the term of this patent is extended or adjusted under 35 U.S.C. 154(b) by 157 days.

(21) Appl. No.: 13/693,860

(22) Filed: Dec. 4, 2012

(65) Prior Publication Data

US 2013/0169204 A1    Jul. 4, 2013

(30) Foreign Application Priority Data

Dec. 8, 2011 (JP) ................. 2011-268702

(51) Int. Cl.
*H02P 27/04* (2006.01)
*H02P 3/14* (2006.01)
*H02M 5/458* (2006.01)
*H02P 27/06* (2006.01)
*H02M 1/32* (2007.01)

(52) U.S. Cl.
CPC *H02P 27/06* (2013.01); *H02P 3/14* (2013.01); *H02M 5/4585* (2013.01); *H02M 1/32* (2013.01); *H02M 5/458* (2013.01)
USPC ...... 318/801; 318/722; 318/800; 318/400.01; 318/727; 363/40; 363/55; 363/71; 363/81; 363/108; 363/109; 363/120; 363/125; 363/131

(58) Field of Classification Search
CPC ................. H02P 27/06; H02P 3/14
USPC ........... 318/400.01, 400.07, 400.14, 400.15, 318/701, 722, 727, 799, 430, 432, 437; 363/40, 55, 56.1, 56.03, 56.04, 56.05, 363/56.07, 61, 81, 71, 84, 98, 108, 109, 363/114, 120, 125, 131; 100/137, 172, 223, 100/269.11
See application file for complete search history.

(56) References Cited

U.S. PATENT DOCUMENTS

| 8,054,012 | B2 | 11/2011 | Matsubara et al. |
| 8,310,848 | B2* | 11/2012 | Sakakibara ............ 363/37 |
| 2010/0192788 | A1 | 8/2010 | Tanaka et al. |
| 2010/0246217 | A1* | 9/2010 | Sakakibara ............ 363/37 |
| 2011/0134663 | A1* | 6/2011 | Sakakibara ............ 363/37 |

FOREIGN PATENT DOCUMENTS

| JP | 60-134782 A | 7/1985 |
| JP | 6-278965 A | 10/1994 |

(Continued)

OTHER PUBLICATIONS

Notification of Reasons for Refusal issued in Japanese Application No. 2011-268702 dated Sep. 10, 2014, w/English translation.

*Primary Examiner* — Antony M Paul
(74) *Attorney, Agent, or Firm* — McDermott Will & Emery LLP

(57) ABSTRACT

A power supply unit for a press machine having a converter (converter circuit) connected to a commercial AC power supply, and an inverter (inverter circuit) connected to a press motor, includes an electrical energy bank, an inrush prevention circuit, an inrush prevention instruction signal generation section, and a contactor switch section, wherein contactors of the inrush prevention circuit are switched from on ON state to an OFF state and inrush prevention resistors of the inrush prevention circuit are connected to AC phase current paths on condition that the inrush prevention instruction signal generation section has generated and output an inrush prevention instruction signal (Sres) during press operation.

9 Claims, 11 Drawing Sheets

(56) References Cited

FOREIGN PATENT DOCUMENTS

| | | |
|---|---|---|
| JP | 2003-143838 A | 5/2003 |
| JP | 2009-095149 A | 4/2009 |
| JP | 2009-106146 A | 5/2009 |
| JP | 2009-136058 A | 6/2009 |
| JP | 2010-178584 A | 8/2010 |

* cited by examiner

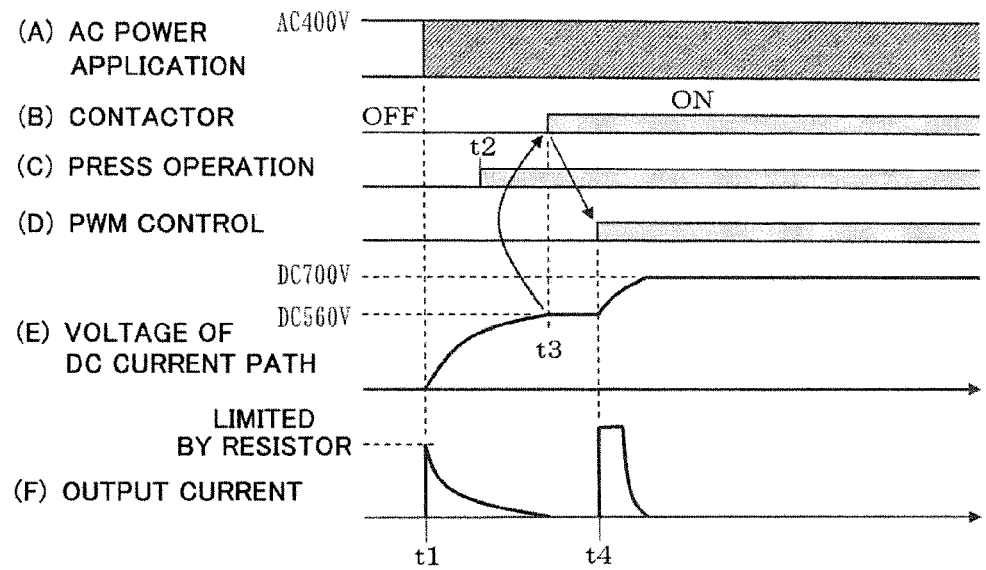
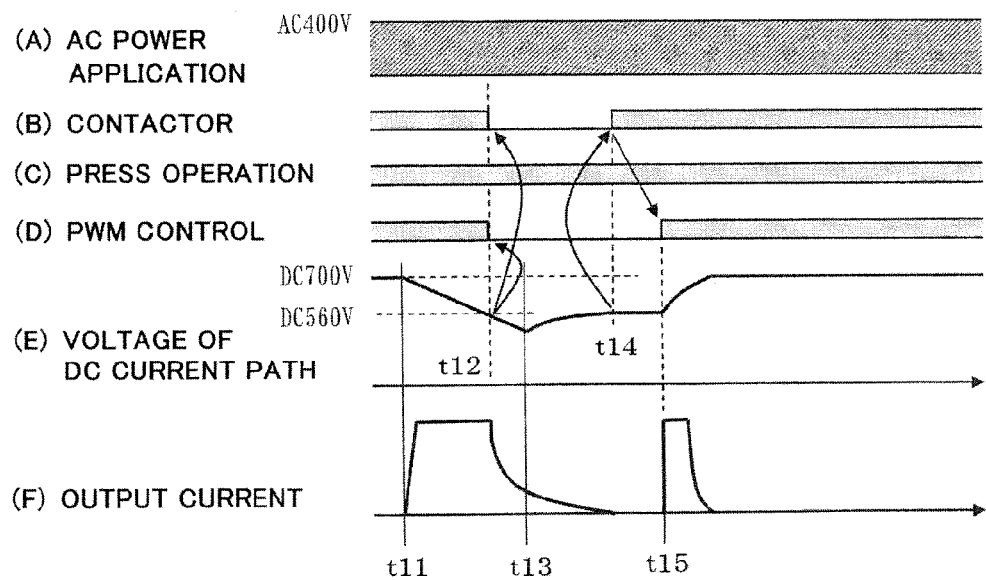

POWER SUPPLY UNIT FOR PRESS MACHINE

Japanese Patent Application No. 2011-268702 filed on Dec. 8, 2011, is hereby incorporated by reference in its entirety.

BACKGROUND OF THE INVENTION

The present invention relates to a power supply unit for a press machine that includes a converter connected to a commercial AC power supply, and an inverter connected to a press motor, and can generate and output motor drive power for driving (rotating) the press motor.

As illustrated in FIG. 11, a motor drive power supply unit normally includes a commercial AC power supply 10P, a converter 30P, and an inverter 60P. AC power is supplied from the commercial AC power supply 10P to the converter 30P via a primary AC current path 11 (AC phase current paths 12, 13, and 14), and the converter 30P outputs DC power generated by AC-DC conversion to a DC current path 40 (positive current path 41 and negative current path 42). The inverter 60P subjects the DC power supplied from the converter 30P to DC-AC conversion (frequency/voltage adjustment). The resulting AC power is supplied to a motor 1P via a secondary AC power supply path 66 (phase drive current paths 67, 68, and 69). The motor 1P can thus be driven (rotated) in a predetermined direction at a predetermined speed and torque.

JP-A-2009-106146 discloses a motor drive device (power supply unit) that is developed from the above power supply unit, wherein a capacitor 8 (indicated by dot-dash line in FIG. 11) is provided between the converter 30P and the inverter 60P. In the power supply unit disclosed in JP-A-2009-106146, the converter is formed by a rectifier circuit, and the inverter is formed by an inverter circuit. The rectifier circuit converts three-phase AC power into DC power to charge the capacitor 8. The inverter is formed by six switching elements that are connected via bridge connection, and diodes that are respectively connected in inverse parallel to the switching elements. The switching elements are ON/OFF-controlled by an inverter control circuit.

The electrical energy (DC power) stored in the capacitor 8 is subjected to DC-AC conversion during a power-running operation to generate and output AC power (motor drive power). The inverter control circuit causes the regeneration energy generated when the motor is decelerated to be returned to the capacitor 8 during a regeneration operation. Specifically, the regeneration energy generated when the motor is decelerated is stored in the capacitor 8, and used as the power-running energy when the motor is accelerated.

JP-A-2010-178584 discloses a power supply unit wherein a converter circuit is formed to implement a regeneration operation, and the regeneration energy of a motor can be returned to a commercial AC power supply. According to the power supply unit disclosed in JP-A-2010-178584, the converter circuit can be repeatedly and carefully operated and stopped corresponding to the DC voltage value. JP-A-2010-178584 states that the above configuration reduces the thermal load applied to the switching element and the like.

JP-A-2003-143838 discloses a device wherein a fuse is connected between a commercial AC power supply and a power supply unit in the same manner as in a normal electrical circuit, and the power supply unit is compulsorily stopped by cutting the fuse when the amount of AC power supplied has exceeded a preset value.

A motor drive device used for a press machine that drives a slide drive mechanism (e.g., crank mechanism) by rotating a motor to move a slide (upper die) upward and downward, and presses a workpiece using the upper die and a lower die attached to a bolster, is selected from various motor drive devices (power supply units) depending on the conditions such as the working capability and the equipment cost.

For example, a power supply unit for a press machine illustrated in FIG. 12 is configured so that the electrical capacity of a converter 30 P and an inverter 60P is set to the same value (1200 kW) as the maximum load (1200 kW) of a motor 1P, and a capacitor 51P has a small capacitance (e.g., 0.3 F). The press machine performs a press operation as illustrated in FIG. 13 (where the vertical axis indicates power (kW), voltage (V), and the slide position (mm), and the horizontal axis indicates time (t)) in which the slide moves downward from top dead center (500 mm) according to the slide motion Msd, press working starts when the slide is positioned about 200 mm above bottom dead center, and ends when the slide is positioned at bottom dead center (0 mm), and the slide then moves upward toward top dead center.

As illustrated in FIG. 13, the motor output Pmt is 1000 kW, and the input power Pss input to the power supply unit is 1070 kW during press working. The input power Pss is larger than the output power Pmt since the efficiency decreases due to mechanical loss and electrical loss. The DC voltage Vdc of the DC current path (DC bus) is about 700 V before press working, and decreases to some extent during press working. However, the DC voltage Vdc is maintained to be almost constant. This is because the ratio of the motor output capacity to the output capacity of the power supply unit is balanced (i.e., 1 (1200 (1000) kW): 1 (1200 (1070) kW)).

When designing a power supply unit for a press machine, it is necessary to carefully take account of conditions specific to the characteristics of the press machine and the press working mode. For example, the press machine is characterized in that a change in load within one cycle (one slide stroke) is significantly larger than that of other industrial machines and the like. Therefore, an improvement effective for implementing a continuous press operation and a reduction in size (i.e., product cost) has been strongly desired.

There may be a case where it is difficult to employ the ideal configuration (i.e., the ratio of the motor output capacity to the output capacity of the power supply unit is set to 1:1) illustrated in FIGS. 12 and 13 that can implement a stable press operation. Specifically, since it is necessary to stably supply the maximum power for a short time (during press working), but the amount of power required during a period other than the press-working period is small, it has been desired to reduce at least the amount of input power and the size of the power supply unit.

When pursuing a reduction in size of the power supply unit, however, the motor drive energy may be insufficient, and the power supply unit may be overloaded due to an overcurrent, so that the parts of the power supply unit may be burned out. Moreover, it may be necessary to stop the press operation even if a change in load occurs only for a short time. It is necessary to avoid cutting the fuse irrespective of the reason why an overload has occurred. This is because the protection technique of cutting the fuse is not realistic since an overcurrent may frequently occur depending on the press conditions (working conditions). The productivity significantly decreases if the press operation of the press machine has been stopped. Moreover, defective products may be obtained, and it may take time to restart the press machine when the press operation has been unintentionally stopped.

Moreover, since the technical specifications of the press machine which are taken into account when designing the power supply unit may arbitrarily be changed (e.g., when the operator arbitrarily sets (changes) the slide motion), inconvenience or disadvantage may occur suddenly during actual operation.

SUMMARY

The invention may provide a power supply unit for a press machine that allows a continuous press operation while preventing a situation in which the parts of the power supply unit are burned out even if the stored energy has become insufficient due to a reduction in size of the power supply unit.

According to a first aspect of the invention, there is provided a power supply unit for a press machine having a converter connected to a commercial AC power supply, and an inverter connected to a press motor, and generating and outputting a motor drive power for driving the press motor, an electrical capacity of the converter during power-running operation being smaller than an electrical capacity of the inverter during power-running operation, the converter being formed by a converter circuit, and the inverter being formed by an inverter circuit that implements a regeneration operation, and the power supply unit comprising:

an electrical energy bank that is provided in a DC current path and stores electrical energy, the DC current path connecting the converter circuit and the inverter circuit;

an inrush prevention circuit that includes inrush prevention resistors and contactors that are respectively connected in parallel to AC phase current paths that connect the commercial AC power supply and the converter circuit;

an inrush prevention instruction signal generation section that generates an inrush prevention instruction signal when a detected actual DC voltage of the DC current path is lower than a comparison reference voltage; and a contactor switch section that switches the contactors of the inrush prevention circuit from an ON state to an OFF state on condition that the inrush prevention instruction signal generation section has generated and output the inrush prevention instruction signal.

According to a second aspect of the invention, there is provided a power supply unit for a press machine having a converter connected to a commercial AC power supply, and an inverter connected to a press motor, and generating and outputting a motor drive power for driving the press motor, an electrical capacity of the converter during power-running operation being smaller than an electrical capacity of the inverter during power-running operation, the converter being formed by a rectifier circuit, and the inverter being formed by an inverter circuit that implements a regeneration operation, and the power supply unit comprising:

an electrical energy bank that is provided in a DC current path and stores electrical energy, the DC current path connecting the rectifier circuit and the inverter circuit;

an inrush prevention circuit that includes inrush prevention resistors and contactors that are respectively connected in parallel to AC phase current paths that connect the commercial AC power supply and the rectifier circuit;

an inrush prevention instruction signal generation section that generates an inrush prevention instruction signal when a detected actual DC voltage of the DC current path is lower than a comparison reference voltage; and a contactor switch section that switches the contactors of the inrush prevention circuit from an ON state to an OFF state on condition that the inrush prevention instruction signal generation section has generated and output the inrush prevention instruction signal.

BRIEF DESCRIPTION OF THE SEVERAL VIEWS OF THE DRAWING

FIG. 7 is a timing chart illustrating an operation when power is applied.

FIG. 8 is a timing chart illustrating an operation during press working.

DETAILED DESCRIPTION OF THE EMBODIMENT

Figure 1:
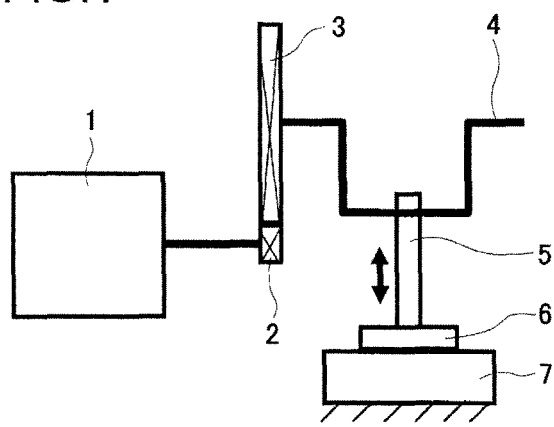
FIG. 1 is a schematic view illustrating a press machine according to a first embodiment of the invention.

According to one embodiment of the invention, there is provided a power supply unit for a press machine having a converter connected to a commercial AC power supply, and an inverter connected to a press motor, and generating and outputting a motor drive power for driving the press motor, an electrical capacity of the converter during power-running operation being smaller than an electrical capacity of the inverter during power-running operation, the converter being formed by a converter circuit, and the inverter being formed by an inverter circuit that implements a regeneration operation, and the power supply unit including:

an electrical energy bank that is provided in a DC current path and stores electrical energy, the DC current path connecting the converter circuit and the inverter circuit;

an inrush prevention circuit that includes inrush prevention resistors and contactors that are respectively connected in parallel to AC phase current paths that connect the commercial AC power supply and the converter circuit;

an inrush prevention instruction signal generation section that generates an inrush prevention instruction signal when a detected actual DC voltage of the DC current path is lower than a comparison reference voltage; and a contactor switch section that switches the contactors of the inrush prevention circuit from an ON state to an OFF state on condition that the inrush prevention instruction signal generation section has generated and output the inrush prevention instruction signal.

According to the power supply unit, it is possible to prevent a situation in which it is impossible to control power conversion even if the stored energy is insufficient. It is also possible to continuously perform the press operation while preventing a situation in which the parts of the power supply unit are burned out.

In the above power supply unit for a press machine, the electrical capacity of the inverter during power-running operation may be set to be identical with the electrical capacity of the press motor, and the electrical capacity of the converter during power-running operation may be set to a value equal to or smaller than half of the electrical capacity of the press motor.

This makes it possible to reduce the capacity and the size of the converter and the commercial AC power supply.

In the above power supply unit for a press machine, the converter may implement a regeneration operation.

According to the power supply unit, since the regeneration energy can be returned to the commercial AC power supply, it is possible to significantly improve the overall power-saving effect.

The above power supply unit for a press machine may further include a step-up circuit that boosts a DC voltage to be supplied to the electrical energy bank, the step-up circuit including reactors that are respectively provided in the AC phase current paths that connect the commercial AC power supply and the converter circuit, the converter circuit, and an ON/OFF drive control section that causes switching elements that form the converter circuit and correspond to respective phases to be turned ON/OFF in a predetermined order.

According to the power supply unit, since the electrical storage capability of the electrical energy bank can be improved due to an increase in voltage, occurrence of a problem due to energy insufficiency can be minimized.

In the above power supply unit for a press machine, the inrush prevention instruction signal generation section may compare an expected DC voltage as the comparison reference voltage with the actual DC voltage, the expected DC voltage being a DC voltage expected to be output from the converter when an actual AC voltage detected from the AC current path is input to the converter.

According to the power supply unit, it is possible to reliably prevent an overcurrent state due to a sudden inrush current while detecting energy insufficiency in advance.

In the above power supply unit for a press machine, the power supply unit may output a press stop instruction when power supplied from the commercial AC power supply is equal to or higher than a rated power handling capability of the inrush prevention resistors when the contactors of the inrush prevention circuit are in the OFF state.

According to the power supply unit, it is possible to safely stop the press operation while protecting the power supply unit (inrush prevention resistors).

In the above power supply unit for a press machine, the power supply unit may output a press stop instruction when power supplied from the commercial AC power supply is equal to or higher than a rated power handling capability of switching elements that form the converter circuit when the contactors of the inrush prevention circuit are in the ON state.

According to the power supply unit, it is possible to safely stop the press operation while protecting the power supply unit (switching elements).

In the above power supply unit for a press machine, the power supply unit may output a press stop instruction when a DC voltage detected from the DC current path is equal to or lower than a predetermined operation continuation voltage.

According to the power supply unit, it is possible to safely stop the press operation while protecting the power supply unit (converter circuit).

According to another embodiment of the invention, there is provided a power supply unit for a press machine having a converter connected to a commercial AC power supply, and an inverter connected to a press motor, and generating and outputting a motor drive power for driving the press motor, an electrical capacity of the converter during power-running operation being smaller than an electrical capacity of the inverter during power-running operation, the converter being formed by a rectifier circuit, and the inverter being formed by an inverter circuit that implements a regeneration operation, and the power supply unit including:

an electrical energy bank that is provided in a DC current path and stores electrical energy, the DC current path connecting the rectifier circuit and the inverter circuit;

inrush prevention circuit that includes inrush prevention resistors and contactors that are respectively connected in parallel to AC phase current paths that connect the commercial AC power supply and the rectifier circuit;

an inrush prevention instruction signal generation section that generates an inrush prevention instruction signal when a detected actual DC voltage of the DC current path is lower than a comparison reference voltage; and a contactor switch section that switches the contactors of the inrush prevention circuit from an ON state to an OFF state on condition that the inrush prevention instruction signal generation section has generated and output the inrush prevention instruction signal.

According to the power supply unit, it is possible to prevent a situation in which it is impossible to control power conversion even if the stored energy is insufficient. It is also possible to continuously perform the press operation while preventing a situation in which the parts of the power supply unit are burned out.

Exemplary embodiments of the invention are described below with reference to the drawings.

First Embodiment

As illustrated in FIGS. 1 to 4, a power supply unit for a press machine according to a first embodiment of the invention having a converter 30 connected to a commercial AC power supply 10, and an inverter 60 connected to a press motor 1, includes an electrical energy bank 50 (e.g., capacitor 51), an inrush prevention circuit 24, an inrush prevention instruction signal generation section 71, and a contactor switch section 73, and a press operation can be continuously performed while protecting the elements (e.g., converter circuit 31) of the power supply unit by switching contactors 26R, 26S, and 26T of the inrush prevention circuit 24 from an ON state to an OFF state to prevent a sudden inrush of current due to supplied AC power on condition that an inrush prevention instruction signal Sres has been generated and output during the press operation.

The converter 30 is formed by a converter circuit 31, and the inverter 60 is formed by an inverter circuit 61 that can implement a regeneration operation. The electrical capacity of the converter 30 (e.g., converter circuit 31) during power-running operation is selected to be smaller than the electrical capacity of the inverter 60 (e.g., inverter circuit 61) during power-running operation. This aims at reducing the capacity and the size of the converter 30 and the commercial AC power supply 10.

Figure 3:
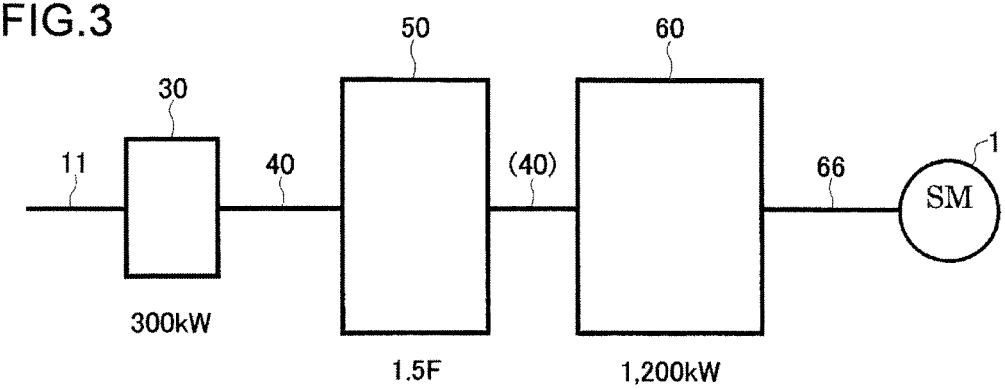
FIG. 3 is a block diagram illustrating the electrical capacity of each element of a power supply unit for a press machine.
Figure 12:
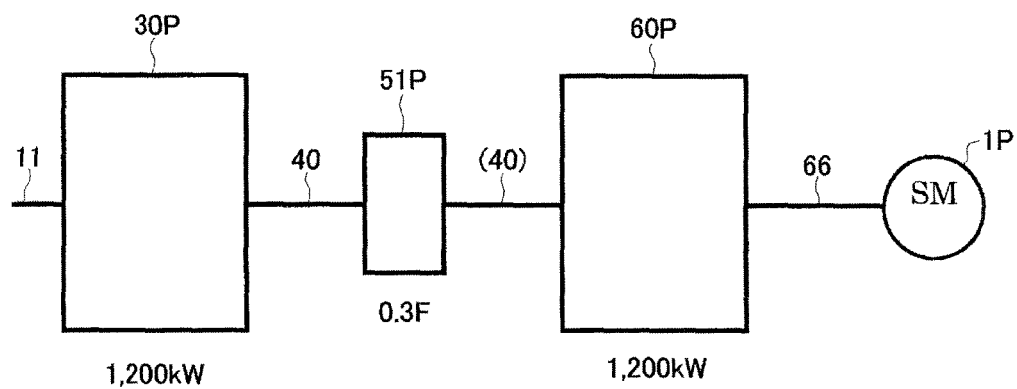
FIG. 12 is a block diagram illustrating the electrical capacity of each element of a related-art power supply unit.

As illustrated in FIG. 3, the capacity of the inverter circuit 61 is set to the same value (1200 kW) as the motor capacity (1200 kW) in the same manner as in the related-art example illustrated in FIG. 12 so that the operation can be performed at the rated maximum output of the press motor 1. On the other hand, the capacity of the converter circuit 31 is set to 300 kW (¼th of the motor capacity) so that the size (capacity) of the converter circuit 31 and the commercial AC power supply 10 can be significantly reduced. The capacity ratio of the press motor 1 to the converter 30 is set to "1 (1200 kW): ¼ (300 kW)" (the capacity ratio of the press motor 1 to the converter 30 is set to "1 (1200 kW): 1 (1200 kW)" in the related-art example).

The capacity ratio may be determined taking account of a reduction in size of the power supply unit, a reduction in cost of the power supply unit, the degree of ease of construction of the power supply unit, a decrease in DC voltage of a DC current path 40, occurrence and the degree of an inrush of current into the converter circuit 31, and capacity matching with the electrical energy bank 50. It is desirable to set the capacity of the converter 30 (e.g., converter circuit 31) to a value (e.g., 600 kW) equal to or smaller than half of the capacity (1200 kW) of the press motor 1 (inverter 60 (e.g., inverter circuit 61)), for example. If the capacity of the converter 30 is set to a value larger than half of the capacity of the press motor 1, a decrease in DC voltage can be reduced, but a reduction in size of the power supply unit and a reduction in cost of the power supply unit may be similar to those achieved by the related-art example (i.e., the advantageous effects of the invention may not be sufficiently achieved).

The amount of electricity (electrical energy) stored in the electrical energy bank 50 is increased by setting the capacitance of a capacitor 51 to 1.5 F, and providing a step-up circuit 20. This makes it possible to prevent a significant decrease in DC voltage Vdc while improving the continuity of the press operation, and prevent a sudden inrush of current into the converter circuit 31 when a decrease in DC voltage occurs, so that the press operation can be continuously performed while protecting the elements (switching element and inrush prevention resistor).

In the first embodiment, the converter circuit 31 is formed to implement a regeneration operation in the same manner as the inverter circuit 61, and the regeneration power from the press motor 1 is returned to the commercial AC power supply (primary AC power supply 10AC) to improve the power-saving effect.

Figure 13:
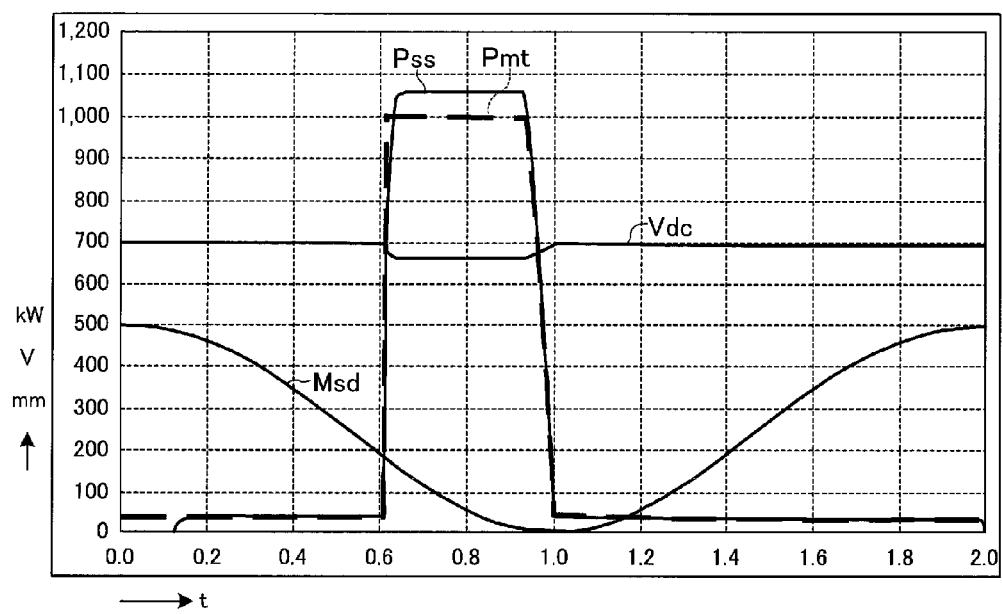
FIG. 13 is a timing chart illustrating the relationship between the input AC power and the press motor load of a related-art power supply unit.

The term "press operation" used in connection with the first embodiment refers to a repeated operation (see FIGS. 3 and 4) in which the slide moves downward from top dead center (500 mm) according to the slide motion Msd, press working starts when the slide is positioned about 200 mm above bottom dead center, and ends when the slide is positioned at bottom dead center (0 mm), and the slide then moves upward toward top dead center in the same manner as in the related-art example illustrated in FIGS. 12 and 13.

Figure 4:
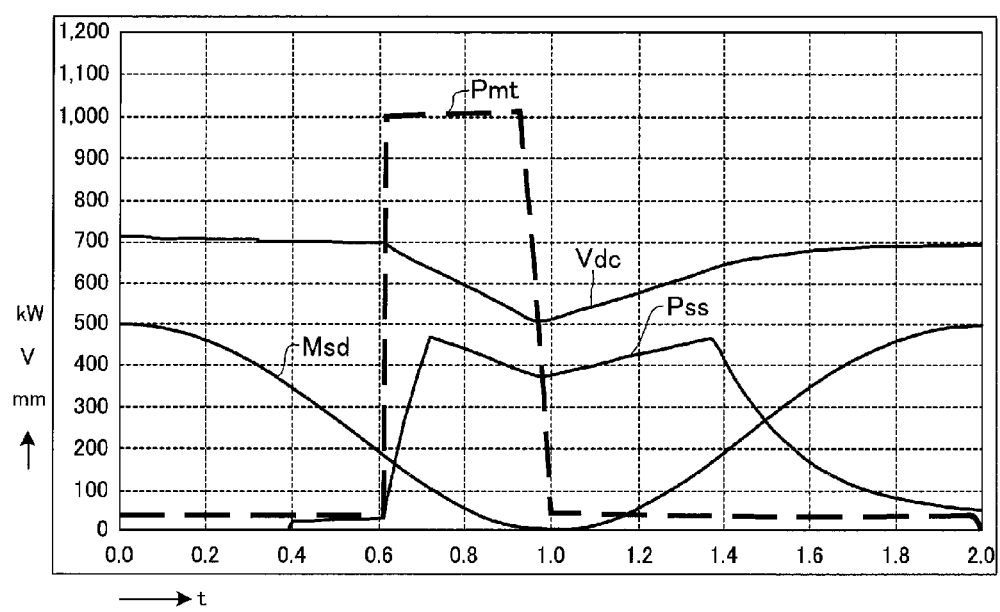
FIG. 4 is a timing chart illustrating the input AC power peak-cut state.

In the first embodiment, the maximum input power (i.e., the input power Pss input to the power supply unit) during press working illustrated in FIG. 4 (where the vertical axis indicates power (kW), voltage (V), and the slide position (mm), and the horizontal axis indicates time (t)) is 470 kW at a motor output Pmt of 1000 kW. Specifically, the peak input power can be reduced by 600 (=1070−470) kW as compared with the related-art example illustrated in FIG. 13.

As illustrated in FIG. 1, the press machine drives a slide drive mechanism by rotating the press motor 1 (e.g., servomotor) to move a slide 6 upward and downward, and presses a workpiece using an upper die attached to the slide 6 and a lower die attached to a bolster 7. In the first embodiment, the slide drive mechanism is a crank mechanism that includes a crank shaft 4 and a connecting rod 5. A main gear 3 engages a pinion gear 2 that is integrally connected to the press motor 1 so that deceleration can be implemented, and the crank shaft 4 is connected to the main gear 3. Note that the press motor 1 may be connected directly to the crank shaft 4. The slide drive mechanism is not limited to the crank mechanism, but may be a mechanism (e.g., link mechanism) other than the crank mechanism.

The press motor 1 is an AC servomotor, and serves as a power source for the servo press machine. The capacity (rated maximum output) of the press motor 1 is 1200 kW. The AC servomotor can be stopped when the press operation is not performed. Note that the motor may be a reluctance motor or the like.

Figure 2:
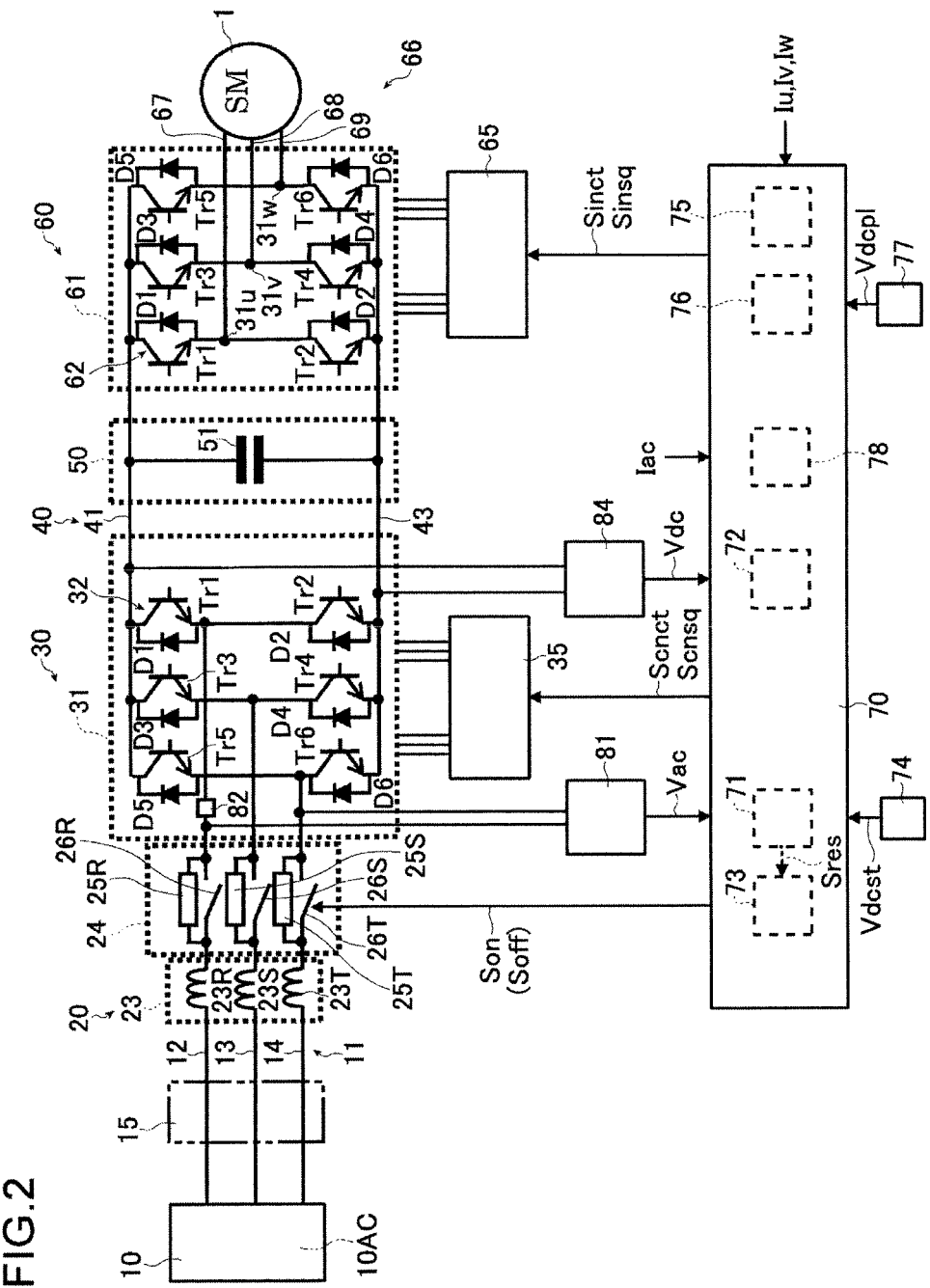
FIG. 2 is a circuit diagram illustrating the overall configuration of a power supply unit for a press machine.

A press operation control section 70 illustrated in FIG. 2 is described below for convenience of description of the press operation and the operation of each element (e.g., converter 30 and inverter 60).

The press operation control section 70 includes a CPU, a memory (e.g., ROM, RAM, and HDD), and an interface, and controls the operation of the entire press machine. The press operation control section 70 outputs a sequence signal Sinsq and a drive control signal Sinct to an inverter drive control circuit 65, and outputs a sequence signal Scnsq and a drive control signal Scnct to a converter drive control circuit 35 when controlling the power supply unit (converter 30 and inverter 60).

The drive control signal Sinct output to the inverter drive control circuit 65 includes a power-running drive control signal that is generated based on information for accelerating the slide and implementing press working according to the slide motion that is set or selected by the operator, and a regeneration drive control signal that is used during deceleration. The drive control signal Scnct output to the converter drive control circuit 35 includes a power-running drive control signal, a step-up drive control signal, and a regeneration drive control signal.

The sequence signals Sinsq and Scnsq are sequence control signals that include a press operation start instruction signal, a press stop instruction signal, and the like for achieving synchronization with the operation of the press machine.

The press operation control section 70 includes the inrush prevention instruction signal generation section 71, a voltage comparison-determination section 72, the contactor switch section 73, a power running/regeneration determination section 75, a press stop instruction signal generation section 76, and a power comparison-determination section 78. The inrush prevention instruction signal generation section 71, the voltage comparison-determination section 72, the contactor switch section 73, the power running/regeneration determination section 75, the press stop instruction signal generation section 76, and the power comparison-determination section 78 are implemented by a processing program stored in the memory, and the CPU that executes the processing program. A comparison reference voltage setting section 74 for setting a comparison reference voltage Vdcst, and an operation continuation voltage setting section 77 for setting an operation continuation voltage Vdcpl are implemented by a key switch.

The inverter 60 illustrated in FIG. 2 that is connected to the press motor 1 is formed by the inverter circuit 61 that can implement a regeneration operation. The inverter circuit 61 includes three pairs of switching elements 62 (three pairs of transistors Tr1 and Tr2, Tr3 and Tr4, and Tr5 and Tr6 that are connected in series) that are connected in parallel between a positive current path 41 and a negative current path 43 that form the DC current path 40. Diodes D1 to D6 (free-wheel diodes) are respectively connected in inverse parallel to the transistors Tr1 to Tr6. Note that a bidirectionally conductive element (e.g., power MOSFET drive IC or reverse-blocking IGBT) is used as the switching element 62.

A series connection terminal 31*u* of the upper arm-side transistor Tr1 connected to the positive current path 41 and the lower arm-side transistor Tr2 connected to the negative current path 43, a series connection terminal 31*v* of the upper arm-side transistor Tr3 connected to the positive current path 41 and the lower arm-side transistor Tr4 connected to the negative current path 43, and a series connection terminal 31*w* of the upper arm-side transistor Tr5 connected to the positive current path 41 and the lower arm-side transistor Tr6 connected to the negative current path 43, are connected to a secondary AC current path 66 (U-phase current path 67, V-phase current path 68, and W-phase current path 69).

The inverter drive control circuit 65 is formed as a microprocessor that includes a CPU. The inverter drive control circuit 65 includes a ROM that stores a control program, a RAM that temporarily stores data, an input/output port, and a communication port in addition to the CPU, and has an ON/OFF drive control function and the like.

The power running/regeneration determination sections 75 determines whether the press operation state (motor load) is a power-running operation state or a regeneration operation state referring to each phase current (Iu, Iv, Iw) of the press motor 1. The press operation control section 70 outputs the drive control signal Sinct that indicates the determination result to the inverter drive control circuit 65. The inverter drive control circuit 65 determines the maximum voltage phase and the minimum voltage phase from the three phases using the detection result of a power supply voltage phase detection section (not illustrated in FIG. 2), and outputs a PWM control signal (switching signal) for causing the upper arm-side transistor Tr that corresponds to the maximum voltage phase and the lower arm-side transistor Tr that corresponds to the minimum voltage phase to be turned ON to the inverter circuit 61.

Specifically, the transistors Tr1, Tr3, Tr5, Tr2, Tr4, and Tr6 are ON/OFF-controlled, and output a three-phase drive voltage based on the PWM control signal output from the inverter drive control circuit 65, so that the motor drive current (Iu, Iv, Iw) can be caused to flow through each phase coil of the press motor 1. This makes it possible to drive (rotate) the press motor 1.

For example, when implementing a motor drive operation using the U-phase coil and the W-phase coil that form the press motor 1, the transistors Tr1 and Tr6 illustrated in FIG. 2 are turned ON by setting the PWM control signal to an ON state, and the transistors Tr2, Tr3, Tr4, and Tr5 are turned OFF by setting the PWM control signal to an OFF state. In this case, a U-phase current (Iud) (drive current) flows from the upper arm-side transistor Tr1 into the U-phase coil through the AC current path 67, and a W-phase current (Iwd) (drive current) flows from the W-phase coil into the lower arm-side transistor Tr2 through the AC current path 69. Specifically, the U-phase current (drive current) flows from the positive terminal of the DC power supply (capacitor 51) into the U-phase coil of the press motor 1, and the W-phase current flows from the W-phase coil into the negative terminal of the DC power supply (capacitor 51).

When implementing a regeneration operation using the U-phase coil and the W-phase coil that form the press motor 1, the transistors Tr1 to Tr6 are turned OFF by setting the PWM control signal to an OFF state. In this case, a U-phase current (Iur) (regeneration current) flows from the lower arm-side free-wheel diode D2 into the U-phase coil through the AC current path 67, and a W-phase current (Iwr) flows the W-phase coil into the upper arm-side free-wheel diode D5 through the AC current path 69. Specifically, the W-phase current (Iwr) (regeneration current) flows from the W-phase coil of the press motor 1 into the positive terminal of the DC power supply (capacitor 51), and the U-phase current (Iur) (regeneration current) flows from the negative terminal of the DC power supply (capacitor 51) into the U-phase coil of the press motor 1.

Note that power loss that corresponds to the product of the forward voltage drop of the free-wheel diodes D2 and D5 and the phase current (Iur and Iwr) may occur since the phase current (Iur and Iwr) (regeneration current) is regenerated to the DC power supply (capacitor 51) through the free-wheel diodes D2 and D5. It is possible to deal with such a situation by regenerating the W-phase current (Iwr) to the capacitor 51 by causing the upper arm-side transistor Tr5 and the lower arm-side transistor Tr2 to be turned ON when it has been detected that the free-wheel diodes D2 and D5 have conducted current, if necessary.

As illustrated in FIG. 2, the converter 30 is formed by the converter circuit 31 that employs a sinusoidal PWM control method and can implement a regeneration operation. The converter circuit 31 includes three pairs of switching elements 32 (three pairs of transistors Tr1 and Tr2, Tr3 and Tr4, and Tr5 and Tr6 that are connected in series) that are connected in parallel between the positive current path 41 and the negative current path 43. Diodes D1 to D6 (free-wheel diodes) are respectively connected in inverse parallel to the transistors Tr1 to Tr6. Specifically, the converter circuit 31 is configured in the same manner as the inverter circuit 61 except for the direction. The relationship between the converter circuit 31 and the commercial AC power supply 10 is functionally the same as the relationship between the inverter circuit 61 and the press motor 1.

The converter drive control circuit 35 is formed as a microprocessor that includes a CPU. The converter drive control circuit 35 includes a ROM that stores a control program, a RAM that temporarily stores data, an input/output port, and a communication port in addition to the CPU. The converter drive control circuit 35 forms an ON/OFF drive control section that forms the step-up circuit 20.

When the power running/regeneration determination section 75 has determined the press operation state (i.e., power-running operation state or regeneration operation state), the press operation control section 70 outputs the drive control signal Scnct that indicates the determination result to the converter drive control circuit 35. The converter drive control circuit 35 ON/OFF-controls the transistors 32 (Tr1 to Tr6).

The converter drive control circuit 35 ON/OFF-controls the switching elements (transistors Tr) 32 in the regeneration operation state while returning the regeneration power to the commercial AC power supply 10 (primary AC power supply 10AC) through an AC reactor 23 (23R, 23S, 23T). A filter (harmonic reactor) 15 (indicated by the dash-dot-dot line in FIG. 2) may be provided between the AC reactor 23 and the commercial AC power supply 10.

Note that the converter circuit 31 operates in the same manner as the inverter circuit 61 during the power-running operation and the regeneration operation. Therefore, further description is omitted.

The step-up circuit 20 includes the converter circuit 31, the AC reactor 23 (23R, 23S, 23T), and the converter drive control circuit 35. The step-up circuit 20 can convert AC power into DC power while boosting the AC power by ON/OFF-controlling the transistors Tr1 to Tr6 of the converter circuit 31.

Figure 5A:
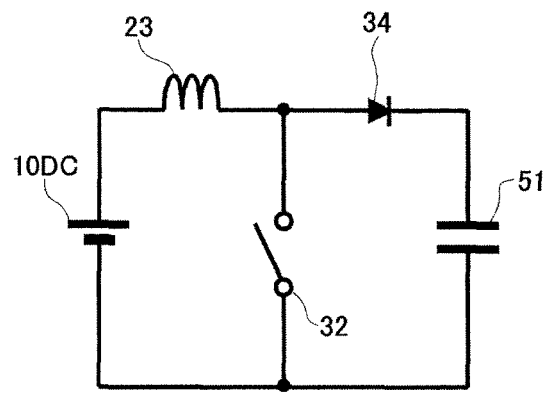
FIG. 5A is a diagram illustrating the operation principle of a step-up/step-down circuit (initial state).
Figure 5B:
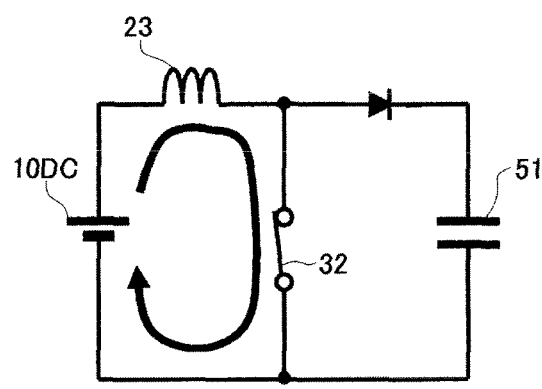
FIG. 5B is a diagram illustrating the operation principle of a step-up/step-down circuit (coil magnetization state).
Figure 5C:
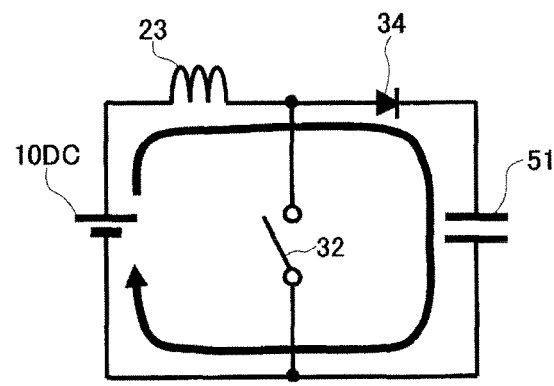
FIG. 5C is a diagram illustrating the operation principle of a step-up/step-down circuit (self-induction state).

The basic principle of the step-up circuit 20 is described below with reference to FIGS. 5A to 5C in which the step-up circuit 20 is simplified as a single-phase circuit that utilizes a DC power supply DC10 as a power supply. FIG. 5A illustrates a state in which the switch (switching element) 32 is turned OFF (initial state). A closed circuit is formed when the switch 32 is turned ON (see FIG. 5B), and a current flows through the reactor (coil) 23 and the switch 32. In this case, the iron core of the reactor 23 is magnetized to store electrical energy. When the switch 32 is turned OFF before the reactor 23 is saturated, the reactor 23 discharges the stored energy. However, since a sufficient current path is not present, a high voltage is detected.

When the switch 32 is then immediately turned OFF (see FIG. 5C), the DC power (10DC) flows through the reactor 23, a diode 34, and the capacitor 51. The voltage discharged from the reactor 23 and the voltage of the DC power supply (10DC) are applied to the capacitor 51. Specifically, the voltage (alpha) generated by the self-induction effect of the reactor 23 is added to the power supply voltage (V). Therefore, a high voltage (V+alpha) can be applied (supplied) to the capacitor 51. The voltage applied to the capacitor 51 can be increased to a value equal to or higher than the power supply voltage (V) by repeating the ON/OFF operation at a high speed.

More specifically, the transistor Tr2 is turned ON, and the transistors Tr1 and Tr3 to Tr6 are turned OFF on the assumption that a primary AC voltage Vacr of the R-phase current path 12 (see FIG. 2) is highest, for example. The R-phase current is branched to the diodes D4 and D6, the contactors 26S and 26T, and the reactors 23S and 23T through the reactor 23R, the contactor 26R, and the transistor Tr2. Specifically, the reactor 23R can be magnetized. When the transistor Tr2 is then turned OFF, the R-phase current flows into the DC current path 40 (positive current path 41) through the diode D1. Specifically, the boosted DC power can be supplied to the electrical energy bank 50.

Although an example in which the step-up circuit is formed integrally with the converter circuit 31 has been described above, the step-up circuit may be implemented by a built-in step-up/step-down circuit described in connection with a third embodiment.

The electrical energy bank 50 is connected to the DC current path 40 that connects the converter circuit 31 and the inverter circuit 61. The electrical energy bank 50 is formed by the capacitor 51. Note that the electrical energy bank 50 may be formed by an electrical double-layer capacitor (EDLC), a secondary battery, or the like.

The power input to the power supply unit (converter circuit 31) is limited in order to reduce the peak of the power supply unit (commercial AC power supply 10 and converter 30). Therefore, it is necessary to supply power to the press motor 1 having the motor maximum output Pmt (1000 kW) (see FIG. 4)) from the electrical energy bank 50 in addition to the power supply unit (converter circuit 31) in order to compensate for the insufficiency. However, when the energy storage capacity of the electrical energy bank 50 (capacitor 51) is increased, cost increases in proportion to the energy storage capacity. Moreover, a situation may occur in which the electrical energy bank 50 cannot be sufficiently charged before the subsequent press working is performed. Therefore, it is necessary to provide the electrical energy bank 50 with a minimum and appropriate energy storage (bank) capacity.

When the quantity of electricity stored in the capacitor 51 is referred to as Q (C), the capacitance of the capacitor 51 is referred to as C (F), and the voltage applied to the capacitor 51 is referred to as V (V), the relationship "$Q=\frac{1}{2}(CV^2)$" is satisfied. Therefore, it is desirable to increase the voltage V in order to increase the quantity of electricity Q stored in the capacitor 51.

In the first embodiment, the capacitance C of the capacitor 51 is set to be larger than that (0.3 F) of the related-art example by a factor of 5 (1.5 F), the power supply voltage Vac (AC 400 V) is converted into the DC voltage Vdc (about DC 560 V) by the operation of the converter circuit 31 during the power-running operation, and the DC voltage Vdc is increased to DC 700 V (see FIG. 4) by the step-up operation of the step-up circuit 20.

The DC voltage Vdc of the DC current path 40 (positive current path 41 and negative current path 43) may decrease even if do the capacitor 51 has an appropriate energy storage (bank) capacity. For example, the DC voltage Vdc may gradually decrease when press working has started at 0.6 seconds (see FIG. 4), and may reach DC 500 V when press working has ended at 1.0 second. The amount of decrease in DC voltage Vdc changes depending on the press-working start position (height) above bottom dead center, the load value during press working, the slide speed during press working, and the like. Moreover, a decrease in voltage easily occurs when the capacity of the converter circuit 31 is small.

For example, when the input AC voltage Vac input to the converter 30 (converter circuit 31) is AC 400 V, and the DC voltage Vdc has decreased to about DC 500 V in a state in which the press operation is performed while the DC voltage Vdc is set to DC 700 V, because a full-wave rectification output voltage (DC voltage Vdc) by the convertor circuit 31 is 560 V, an inrush of current from the commercial AC power supply 10 (primary AC power supply 10AC) through the free-wheel diode D that is connected in inverse parallel to the transistor Tr of the converter circuit 31 occurs due to the potential difference. In this case, the free-wheel diode D may be burned out due to an overcurrent.

Specifically, the DC voltage Vdc may decrease to an unexpectedly low voltage value when the capacity of the converter circuit 31 is decreased even if the electrical storage capacity of the electrical energy bank 50 is maximized within the allowable range. The slide motion (i.e., the relationship between the slide position and the time or the crank angle) that is arbitrarily set and selected by the operator also significantly affects a decrease in the DC voltage Vdc during the actual press operation. The press motor 1 may be overloaded depending on the press working mode.

When the DC voltage Vdc has decreased to a value equal to or lower than the expected lowest voltage value, it is impossible to control the converter circuit 31, and continue the press operation. Moreover, a phenomenon in which a high current rushes into the converter circuit 31 from the commercial AC power supply 10 may occur when the press operation is stopped with a time delay. However, the continuity of the press operation is impaired if the press operation is compulsorily stopped when a decrease in the DC voltage Vdc has been detected. For example, it is considered that the press operation can be continuously performed if it is possible to provide some allowable time until the DC voltage Vdc increases.

The power supply unit according to the first embodiment is configured so that the elements (transistor Tr, diode D, and inrush prevention resistor) of the converter circuit 31 can be protected, and the press operation can be continuously performed by providing the inrush prevention circuit 24, the inrush prevention instruction signal generation section 71, and the contactor switch section 73. The power supply unit according to the first embodiment is formed so that the press operation can be stopped only when it is expected that the worst case will occur while monitoring the DC power supply during the continuous operation.

As illustrated in FIG. 2, the inrush prevention circuit 24 includes inrush prevention resistors 25R, 25S, and 25T that are connected to the primary AC current path 11 (AC phase current paths 12, 13, and 14) that connects the commercial AC power supply 10 and the converter circuit 31, and the contactors 26R, 26S, and 26T for bypassing the inrush prevention resistors 25R, 25S, and 25T (i.e., electrically disconnecting the inrush prevention resistors 25R, 25S, and 25T from the AC phase current paths 12, 13, and 14) in an ON state.

In the first embodiment, the inrush prevention resistors 25R, 25S, and 25T can also be used when charging the capacitor 51 in an initial state (i.e., when the amount of electricity stored in the capacitor 51 is zero). Note that a dedicated overcurrent prevention resistor used in the initial state may be provided.

Figure 6:
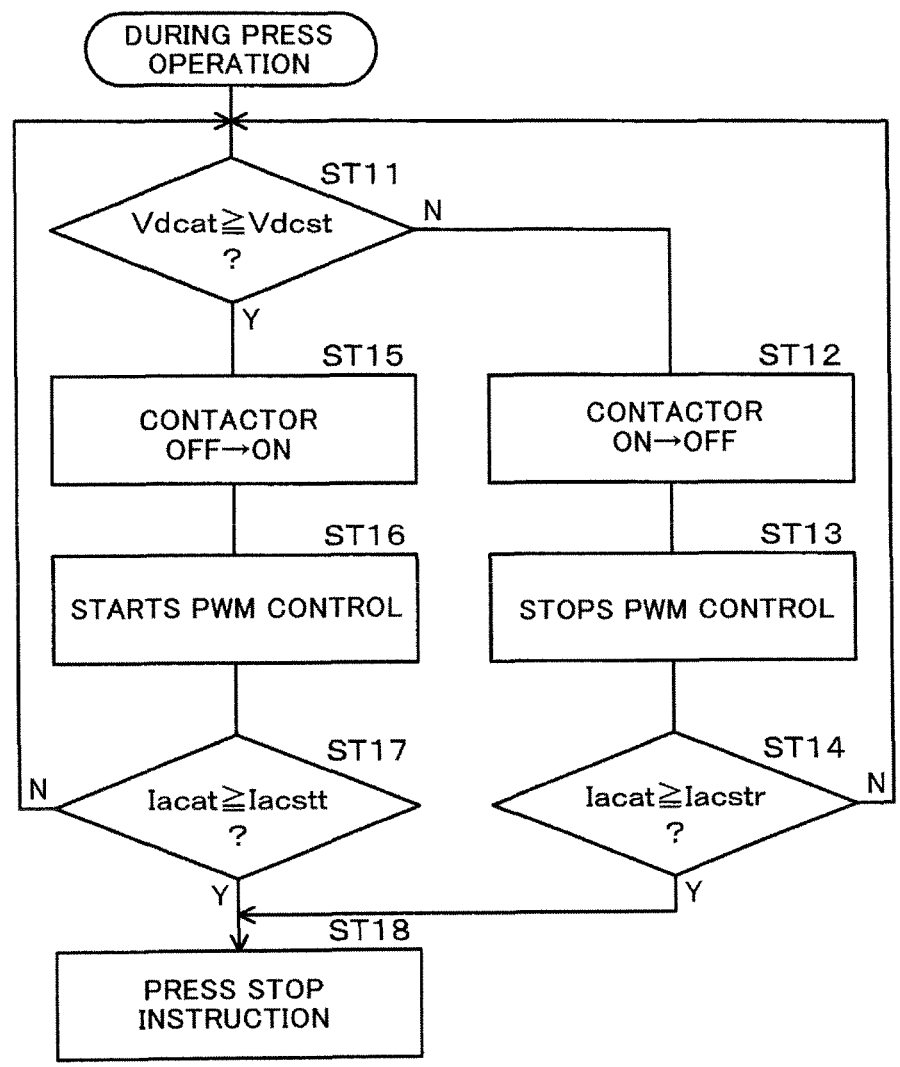
FIG. 6 is a flowchart illustrating an operation when power is applied, and an operation during press working.

The inrush prevention instruction signal generation section 71 generates the OFF inrush prevention instruction signal Sres (see FIG. 2), and outputs the OFF inrush prevention instruction signal Sres to the contactor switch section 73 when it has been determined that an actual DC voltage Vdcat of the DC current path 40 detected by the voltage comparison-determination section 72 is lower than the comparison reference voltage Vdcst (NO in ST11 in FIG. 6).

The actual DC voltage Vdcat is detected by a DC voltage detector 84 (see FIG. 2), and the comparison reference voltage Vdcst is set using the comparison reference voltage setting section 74.

The inrush prevention instruction signal generation section 71 generates the ON inrush prevention instruction signal Sres, and outputs the ON inrush prevention instruction signal Sres to the contactor switch section 73 when it has been determined that the actual DC voltage Vdcat is equal to or higher than the comparison reference voltage Vdcst (YES in ST11).

The contactor switch section 73 outputs an OFF contactor switch instruction signal Soff so that the contactors 26R, 26S, and 26T of the inrush prevention circuit 24 are switched from an ON state to an OFF state on condition that the inrush prevention instruction signal generation section 71 has generated and output the OFF inrush prevention instruction signal Sres (NO in ST11). In this case, the press operation control section 70 outputs a PWM control stop instruction signal (Scnct) to the converter circuit 31 (ST13).

The PWM control process performed on the converter circuit 31 is thus stopped, and the converter circuit 31 performs an AC full-wave rectification operation as a rectifier circuit (diode bridge circuit). The converter circuit 31 converts the AC power into DC power through the inrush prevention resistors 25R, 25S, and 25T, and supplies DC power to the DC current path 40. Specifically, the press operation can be continuously performed while supplying power to the capacitor 51.

However, when the load of the press motor 1 increases for a time longer than the expected time, or a large amount of DC power is consumed due to a failure or the like, the amount of energy discharged from the capacitor 51 unexpectedly increases, so that the DC voltage Vdc may decrease to a large extent. As a result, the power (AC current Iacat) supplied from the commercial AC power supply 10 to the converter circuit 31 increases, and becomes equal to or higher than the rated power handling capability (rated current Iacstr) of the inrush prevention resistors 25R, 25S, and 25T.

In this case, the power comparison-determination section 78 determines that the supplied AC current (Iacat) is equal to or higher than the rated current (Iacstr) (YES in ST14). The press stop instruction signal generation section 76 then outputs the press stop instruction signal Sinsq (Scnsq) to the inverter drive control circuit 65 (inverter drive control circuit 35) to stop the press operation (ST18). This makes it possible to prevent a situation in which the inrush prevention resistors 25R, 25S, and 25T are burned out. Therefore, it is possible to prevent a situation in which the diode D of the converter circuit 31 is burned out, and check the press machine for restarting the press operation.

Note that the power may be monitored by directly detecting the rated power handling capability instead of monitoring the rated power handling capability as the equivalent current.

The contactor switch section 73 outputs an ON contactor switch instruction signal Son so that the contactors 26R, 26S, and 26T of the inrush prevention circuit 24 are switched from an OFF state to an ON state when the voltage comparison-determination section 72 has determined that the actual DC voltage Vdcat is equal to or higher than the comparison reference voltage (Vdcst) (YES in ST11) (or when the inrush prevention instruction signal generation section 71 has stopped outputting the OFF inrush prevention instruction signal Sres) (ST15).

The press operation control section 70 outputs the PWM control start instruction signal (Scnsq and Scnct) to the converter circuit 31 (ST16). The converter drive control circuit 35 performs the PWM control process on the converter circuit (Tr) 31 to charge the capacitor 51 while boosting the DC voltage. The PWM control start instruction signal (Sinsq and Sinct) is also output to the inverter circuit 61 (ST16). The inverter drive control circuit 65 performs the PWM control process on the inverter circuit (Tr) 61 to control the rotation of the press motor 1.

Again, when the load of the press motor 1 increases for a time longer than the expected time, or a large amount of DC power is consumed due to a failure or the like, the power (Iacat) supplied from the commercial AC power supply 10 to the converter circuit 31 may become equal to or higher than the rated power handling capability (Iacstt) of the switching element (transistors Tr1 to Tr6) 32.

In this case, the power comparison-determination section 78 determines that the supplied AC current (Iacat) is equal to or higher than the rated current (Iacstt) of the transistors Tr1 to Tr6 (YES in ST17). The press stop instruction signal generation section 76 then outputs the press stop instruction signal Sinsq (Scnsq) to the inverter drive control circuit 65 (inverter drive control circuit 35) to stop the press operation (ST18). This makes it possible to prevent a situation in which the parts (transistors Tr1 to Tr6) of the converter circuit 31 are burned out. Therefore, it is possible to check the press machine for restarting the press operation.

The monitoring target in the steps ST17 and ST14 should be an element having the minimum rated power handling capability. For example, the diode D may be monitored in the step ST14 so as to protect the converter circuit 31 instead of the inrush prevention resistors 25R, 25S, and 25T.

The press stop instruction output section 76 may be formed to output the press stop instruction when the DC voltage Vdc of the DC current path 40 detected by the DC voltage detector 84 is equal to or lower than the predetermined operation continuation voltage (Vdcpl). This is effective as a means for safely stopping the press machine. Specifically, the cause of a sudden AC power inrush phenomenon can be observed in the subsequent stage of the converter circuit 31. The operation continuation voltage (Vdcpl) is set using the operation continuation voltage setting section 77 illustrated in FIG. 2.

Since the contactors 26R, 26S, and 26T of the inrush prevention circuit 24 are set to an OFF state, and the inrush prevention resistors 25R, 25S, and 25T function when the press operation start instruction has been issued, occurrence of a sudden overcurrent can be prevented even if the quantity of electricity stored in the capacitor 51 is zero. Specifically, since the converter circuit 31 functions as a rectifier circuit, the DC voltage Vdc of the DC current path 40 gradually increases. The voltage increases as the amount of energy stored in the capacitor 51 increases. Specifically, the steps ST11-ST14-ST11 in FIG. 6 effectively function even when starting the press operation. Note that an overcurrent prevention circuit that functions only in the initial state may be provided.

The advantageous effects and the operation of the first embodiment are described below with reference to FIGS. 7 and 8.

when Power is Applied

When the primary AC power supply 10AC (AC 400 V) has been applied at a time t1 (see (A) in FIG. 7) in a state in which the contactors 26R, 26S, and 26T of the inrush prevention circuit 24 are set to an OFF state (i.e., the inrush prevention resistors 25R, 25S, and 25T are not bypassed) (see (B) in FIG. 7), and the PWM control process is not performed, the converter circuit 31 functions as a rectifier circuit through the free-wheel diodes D that are connected in inverse parallel to the transistors, and performs a three-phase full-wave rectification operation. The actual DC voltage Vdcat of the DC current path 40 gradually increases (see (E) in FIG. 7). Since the output current (see (F) in FIG. 7) is limited by the inrush prevention resistors 25R, 25S, and 25T, occurrence of an overcurrent is prevented. Therefore, the safety of the power supply unit (press machine) is ensured.

When the press operation start instruction has been issued at a time t2 (see (C) in FIG. 7), the voltage comparison-determination section 7 determines whether or not the actual DC voltage Vdcat is equal to or higher than the comparison reference voltage (Vdcst) (ST11 in FIG. 6). When the voltage comparison-determination section 7 has determined that the actual DC voltage Vdcat is lower than the comparison reference voltage (Vdcst) (NO in ST11), the steps ST12 and ST13 are omitted since the contactors 26R, 26S, and 26T are set to an OFF state, and the PWM control process is not performed. When it has been determined that the supplied AC current (Iacat) is lower than the rated current (Iacstr) in the step ST14, the step S11 is performed again. Specifically, the DC power converted by the three-phase full-wave rectification operation of the converter circuit 31 is stored in the capacitor 51.

When the voltage comparison-determination section 72 has determined that the actual DC voltage (Vdcat=560 V) is equal to or higher than the comparison reference voltage (Vdcst=560 V) at a time t3 (YES in ST11), the inrush prevention instruction signal generation section 71 generates and outputs the ON inrush prevention instruction signal Sres. The contactor switch section 73 then outputs the contactor switch instruction signal Son (see (B) in FIG. 7) so that the contactors 26R, 26S, and 26T are switched from an OFF state to an ON state (ST15). Therefore, the inrush prevention resistors 25R, 25S, and 25T are bypassed (i.e., disconnected from the AC current path 11).

The converter drive control circuit 35 that has received the PWM control start instruction (Scnsq and Scnct) at a time t4 at which the actual DC voltage (Vdcat=560 V) has become stable starts the PWM control process on the converter circuit 31 (ST16). The output current changes as indicated by (F) in FIG. 7. The step-up circuit 20 starts the step-up operation at this timing. Specifically, the step-up circuit 20 boosts the direct current Vdc from DC 560 V to DC 700 V (see (E) in FIG. 7) by ON/OFF-controlling the transistors Tr1 to Tr6 using the converter drive control circuit 35. This makes it possible to maximize the amount of electrical energy stored in the capacitor 51. Specifically, the press operation can be started.

During Press Operation

The voltage comparison-determination section 72 always monitors the DC voltage Vdc during the press operation (i.e., when the primary AC power supply 10AC is being supplied, and the press operation has started (see (A) and (C) in FIG. 8)) (ST11 in FIG. 6). When press working has been performed at a time t11 in FIG. 8, the electrical energy is discharged from the capacitor 51 to the inverter circuit 61 (press motor 1) in a burst. Therefore, the DC voltage Vdcat of the DC current path 40 rapidly decreases from 700 V (see (E) in FIG. 8). Since power is supplied to the DC current path 40 from the converter circuit 31 after completion of press working, the amount of electrical energy stored in the capacitor 51 will increase, and the DC voltage will increase to reach 700 V.

However, the forming load (forming energy) during press working differs to a large extent depending on items (e.g., die, die cushion, and workpiece hardness) specific to the press machine. Specifically, when the forming energy is unexpectedly large, it is impossible to supply energy for compensating for the insufficiency. As a result, the DC voltage Vdc continuously decreases. For example, the DC voltage Vdc may decrease to a value equal to or lower than DC 560 V (see (E) in FIG. 8).

When the voltage comparison-determination section 72 has determined that the actual DC voltage (Vdcat=7560 V) is lower than the comparison reference voltage (Vdcst=560 V) at a time t12 (NO in ST11), the inrush prevention instruction signal generation section 71 generates and outputs the OFF inrush prevention instruction signal Sres. The contactor switch section 73 then outputs the contactor switch instruction signal Soff so that the contactors 26R, 26S, and 26T are switched from an ON state to an OFF state (see (B) in FIG. 8) (ST12). Therefore, the inrush prevention resistors 25R, 25S, and 25T are respectively connected to the AC current paths 12, 13, and 14. This makes it possible to prevent an inrush of an overcurrent into the converter circuit 31.

In this case, the press operation control section 70 outputs the PWM control stop instruction signal (Scnct) to the converter circuit 31 (ST13), and outputs the PWM control stop instruction signal (Sint) to the inverter circuit 61 (ST13).

When the PWM control stop instruction (Scnct) has been issued at a time t12, the converter drive control circuit 35 stops the PWM control process on the converter circuit 31 (see (D) in FIG. 8) (ST13). The output current decreases as indicated by (F) in FIG. 8. Specifically, the press operation is suspended until the capacitor 51 is charged (i.e., until the DC voltage Vdc is recovered).

The voltage continuously decreases from the time t12, but increases from a time t13 at which press working has completed, and the DC voltage Vdc gradually and slowly increases. Specifically, when a decrease in voltage (Vdcst>Vdcat) has occurred by some rare accident (NO in ST11), the contactors 26R, 26S, and 26T are turned OFF (ST12), and the PWM control process is stopped (ST13). Energy is automatically supplied at a power (Iacat) equal to or less than the rated power handling capability (rated current Iacstr) of the inrush prevention resistors 25R, 25S, and 25T, and the step ST11 (DC voltage comparison) is performed again. In this case, the power monitor protection function (ST14) utilizing the inrush prevention resistors 25R, 25S, and 25T is also enabled.

When it is impossible to supply energy to compensate for the insufficiency (forming energy), and an overcurrent flows into the converter circuit 31, the press stop instruction output section 76 outputs the press stop instruction signal (Sinsq and Scnsq) to stop the press operation when the power comparison-determination section 78 has determined that the supplied AC current (Iacat) is equal to or higher than the rated current (Iacstr) (YES in ST14) (ST18). This makes it possible to prevent a situation in which the inrush prevention resistors 25R, 25S, and 25T are burned out. Specifically, it is possible to safely stop the press operation while protecting the power supply unit (converter 30).

When it is possible to supply energy to compensate for the insufficiency (forming energy), and an overcurrent does not flow into the converter circuit 31, the DC voltage Vdc returns to DC 560 V at a time t14 (NO in ST14 and YES in ST11). The inrush prevention instruction signal generation section 71 generates and outputs the ON inrush prevention instruction signal Sres. The contactor switch section 73 outputs the contactor switch instruction signal Son so that the contactors 26R, 26S, and 26T are switched from an OFF state to an ON state (see (B) in FIG. 8) (ST15). Therefore, the inrush prevention resistors 25R, 25S, and 25T are disconnected from the AC current paths 12, 13, and 14.

The converter drive control circuit 35 that has received the PWM control start instruction at a time t15 at which the actual DC voltage (Vdcat=560 V) has become stable starts the PWM control process on the converter circuit 31 (ST16). The step-up circuit 20 starts the step-up operation at this timing. Specifically, the step-up circuit 20 boosts the direct current Vdc from DC 560 V to DC 700 V (see (E) in FIG. 8) by ON/OFF-controlling the transistors Tr1 to Tr6 using the converter drive control circuit 35 (ON/OFF control section). This makes it possible to maximize the amount of electrical energy stored in the capacitor 51.

Energy is automatically supplied at a power (current Iacat) equal to or less than the rated power handling capability (rated current Iacstt) of the switching element 32, and the step ST11 (DC voltage comparison) is performed again. In this case, the power monitor protection function (ST17) utilizing the switching element 32 (transistors Tr1 to Tr6) is also enabled.

However, an overcurrent may flow into the converter circuit 31 during the PWM control process. In such a case, the parts (transistors Tr) of the converter circuit 31 may be burned out due to the overcurrent in the same manner as the inrush prevention resistors 25R, 25S, and 25T.

When such a situation has occurred, the power comparison-determination section 78 determines that the supplied AC current (Iacat) is equal to or higher than the rated current (Iacstt) of the transistors Tr (YES in ST17). The press stop instruction signal generation section 76 outputs the press stop instruction signal (Sinsq and Scnsq) to stop the press operation (ST18). This makes it possible to prevent a situation in which the transistors Tr1 to Tr6 are burned out. Specifically, it is possible to safely stop the press operation while protecting the power supply unit 30 (31).

When the forming load (forming energy) during press working is low, the steps ST11 to ST17 in FIG. 6 are repeated, and energy for compensating for the forming energy is stored in the electrical energy bank 50 through the converter 30.

In FIG. 6, the press stop instruction (ST18) is output based on the power monitor result obtained in the step ST14 or ST17. Note that whether or not the DC voltage Vdc is equal to or lower than the predetermined operation continuation voltage (Vdcpl) that is necessary for the press operation may be monitored, and the press stop instruction (ST18) may be output based on the monitor result.

According to the first embodiment, since the electrical capacity of the converter 30 (converter circuit 31) is smaller than the electrical capacity of the inverter 60 (inverter circuit 61), the electrical energy bank 50, the inrush prevention circuit 24, the inrush prevention instruction signal generation section 71, and the contactor switch section 73 are provided, and the contactor 26 can be set to an OFF state on condition that the inrush prevention instruction signal has been generated and output, it is possible to prevent a situation in which it is impossible to control power conversion even if the stored energy is insufficient. It is also possible to continuously perform the press operation while preventing a situation in which the parts (inrush prevention resistor, free-wheel diode, and switching element) are burned out.

Since the electrical capacity of the inverter 60 is set to be identical with the electrical capacity of the press motor 1, and the electrical capacity of the converter 30 is set to a value equal to or smaller than half of the electrical capacity of the press motor 1, the capacity and the size of the converter 30 and the commercial AC power supply 10 can be reduced.

Since the converter 30 can implement the regeneration operation in the same manner as the inverter 60, the regeneration energy from the press machine (press motor 1) can be returned to the commercial AC power supply 10 (primary AC power supply 10AC). This makes it possible to significantly improve the overall power-saving effect.

Since the step-up circuit 20 that includes the reactor 23, the converter circuit 31, and the ON/OFF drive control section (converter drive control circuit 35) can boost the DC voltage supplied to the electrical energy bank 50, the electrical storage capability of the electrical energy bank 50 can be improved due to an increase in voltage, and occurrence of a problem due to energy insufficiency can be minimized.

Since the press stop instruction can be output when the power supplied from the commercial AC power supply 10 is equal to or higher than the rated power handling capability of the inrush prevention resistors 25R, 25S, and 25T, it is possible to safely stop the press operation while protecting the power supply unit (inrush prevention resistors 25R, 25S, and 25T).

Since the press stop instruction can be output when the power supplied from the commercial AC power supply 10 is equal to or higher than the rated power handling capability of the switching element 32 (Tr) that forms the converter circuit 31 when the contactor 26 of the inrush prevention circuit 24 is set to an ON state, it is possible to safely stop the press operation while protecting the power supply unit (switching element 32).

Since the press stop instruction can be output when the actual DC voltage Vdcat detected from the DC current path 40 is equal to or lower than the predetermined operation continuation voltage (Vdcpl), it is possible to safely stop the press operation while protecting the power supply unit (converter circuit 31).

Second Embodiment

A power supply unit for a press machine according to a second embodiment of the invention is the same as the power supply unit according to the first embodiment as to the basic configuration and functions (FIGS. 1 to 4 and 6 to 8), but differs from the power supply unit according to the first embodiment in that an inrush prevention instruction signal generation section 90 that utilizes a prior determination method is used as the inrush prevention instruction signal generation section instead of the inrush prevention instruction signal generation section 71 that utilizes a result determination method.

Figure 9:
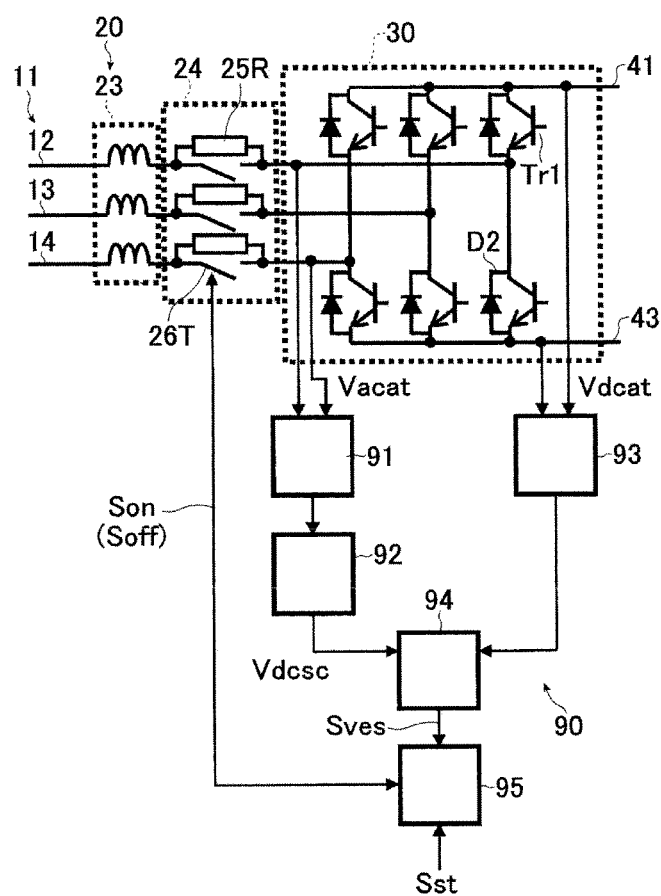
FIG. 9 is a circuit diagram illustrating an inrush prevention instruction signal generation section according to a second embodiment of the invention.

As illustrated in FIG. 9, the inrush prevention instruction signal generation section 90 is formed to compare the actual DC voltage Vdcat with an expected DC voltage (comparison reference voltage) Vdcsc that is expected to be output from the converter circuit 31 to the DC current path 40 when the actual three-phase AC voltage Vac detected from the primary AC current path 11 (AC phase current paths 12, 13, and 14) is input to the converter 30 (converter circuit 31), and generate and output the inrush prevention instruction signal.

As illustrated in FIG. 9, the inrush prevention instruction signal generation section 90 includes an AC voltage detection section 91, a DC voltage conversion section 92, a DC voltage detection section 93, a voltage comparison section 94, and an instruction signal generation section 95, and operates when a press operation start signal Sst has been input. The AC voltage detection section 91 detects an AC voltage (i.e., the voltage Vacat between the R phase and the T phase) from the R-phase current path 12 and the T-phase current path 14, for example. The DC voltage detection section 93 may also serve as the DC voltage detector 84 described above in connection with the first embodiment.

The DC voltage conversion section 92 calculates the DC voltage (expected DC voltage Vdcsc) of the DC that is expected to be output from the converter circuit 31 to the DC current path 40 when the AC power at the actual AC voltage Vacat has been input to the converter 30 (converter circuit 31). Specifically, the DC voltage conversion section 92 calculates the converted expected DC voltage Vdcsc that corresponds to the voltage after the full-wave rectification operation from the target (input AC power) that is converted by the converter circuit 31 and the conversion characteristics of the converter circuit 31 before the full-wave rectification operation is performed.

The voltage comparison section 94 compares the converted expected DC voltage Vdcsc (comparison reference voltage) with the actual DC voltage Vdcat. When the voltage comparison section 94 has determined that the actual DC voltage Vdca is lower than the converted expected DC voltage Vdcsc, the instruction signal generation section 95 generates and outputs the inrush prevention instruction signal Sres.

The contactor switch section 73 outputs the contactor switch instruction signal Soff so that the contactors 26R, 26S, and 26T of the inrush prevention circuit 24 are switched from an ON state to an OFF state on condition that the inrush prevention instruction signal generation section 90 (voltage comparison section 94) has generated and output the OFF inrush prevention instruction signal Sres (ST12 in FIG. 6).

The contactor switch section 73 outputs the contactor switch instruction signal Son so that the contactors 26R, 26S, and 26T of the inrush prevention circuit 24 are switched from an OFF state to an ON state on condition that the inrush prevention instruction signal generation section 90 (voltage comparison section 94) has generated and output the ON inrush prevention instruction signal Sres (ST15 in FIG. 6).

According to the second embodiment, the advantageous effects achieved by the first embodiment can also be achieved. Moreover, since the inrush prevention instruction signal generation section 90 can compare the converted expected DC voltage Vdcsc (comparison reference voltage) with the actual DC voltage, it is possible to reliably prevent sudden occurrence of an overcurrent in advance while detecting energy insufficiency.

Third Embodiment

A power supply unit for a press machine according to a third embodiment of the invention is the same as the power supply unit according to the second embodiment as to the basic configuration and functions (FIGS. 1 to 4 and 6 to 9), but differs from the power supply unit according to the second embodiment in that a rectifier circuit 36 is used as the converter 30 instead of the converter circuit 31 used in the second embodiment that can implement the regeneration operation.

Figure 10:
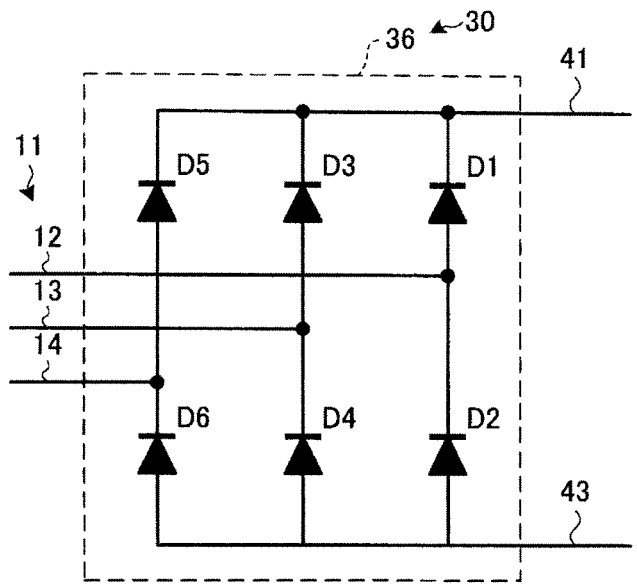
FIG. 10 is a circuit diagram illustrating a converter (rectifier circuit) according to a third embodiment of the invention.
Figure 11:
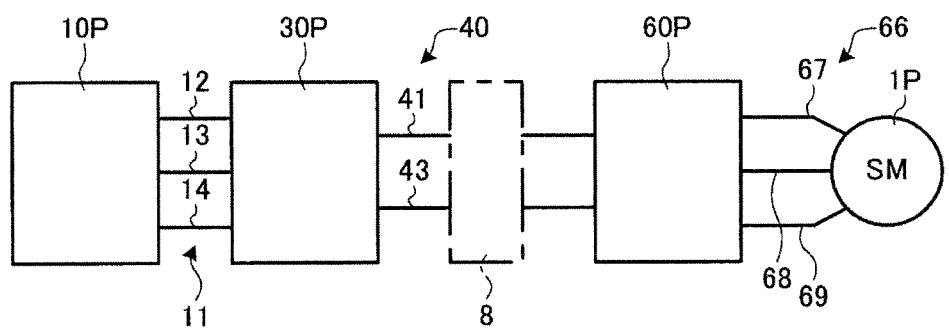
FIG. 11 is a block diagram illustrating a related-art example.

As illustrated in FIG. 10, the rectifier circuit 36 is formed by connecting diodes D1 to D6 via bridge connection. The rectifier circuit 36 subjects the AC power input from the AC phase current paths 12, 13, and 14 to full-wave rectification, and outputs the DC power to the DC current path 40 (positive current path 41 and negative current path 43).

In the third embodiment, the reactor 23 (23R, 23S, 23T) illustrated in FIG. 1 is omitted, but the filter 15 is provided.

Note that the inrush prevention instruction signal generation section 71 used in the first embodiment may be used as the inrush prevention instruction signal generation section instead of the inrush prevention instruction signal generation section 90 used in the second embodiment.

According to the third embodiment, it is possible to prevent a situation in which it is impossible to control power conversion even if the stored energy is insufficient in the same manner as in the second embodiment. It is also possible to continuously perform the press operation while preventing a situation in which the parts of the power supply unit (rectifier circuit 36) are burned out. Moreover, since the configuration of the converter 30 is simplified as compared with the second embodiment, the power supply unit according to the third embodiment can be easily employed when it is desired to further reduce the size and the cost of the power supply unit.

Note that a built-in step-up/step-down circuit that includes a plurality of switching elements, a plurality of diodes that are connected in inverse parallel to the plurality of switching elements, and a reactor may be connected (provided) between the positive current path 41 and the negative current path 43 positioned on the output side of the rectifier circuit 36, and the voltage boosted by the step-up/step-down circuit may be supplied from the capacitor 51 to the inverter circuit 61.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A power supply unit for a press machine having a converter connected to a commercial AC power supply, and an inverter connected to a press motor, and generating and outputting a motor drive power for driving the press motor, an electrical capacity of the converter during power-running operation being smaller than an electrical capacity of the inverter during power-running operation, the converter being formed by a converter circuit, and the inverter being formed by an inverter circuit that implements a regeneration operation, and the power supply unit comprising:

an electrical energy bank that is provided in a DC current path and stores electrical energy, the DC current path connecting the converter circuit and the inverter circuit;

an inrush prevention circuit that includes inrush prevention resistors and contactors that are respectively connected in parallel to AC phase current paths that connect the commercial AC power supply and the converter circuit;

an inrush prevention instruction signal generation section that generates an inrush prevention instruction signal when a detected actual DC voltage of the DC current path is lower than a comparison reference voltage; and a contactor switch section that switches the contactors of the inrush prevention circuit from an ON state to an OFF state on condition that the inrush prevention instruction signal generation section has generated and output the inrush prevention instruction signal.

2. The power supply unit for a press machine as defined in claim 1, wherein the electrical capacity of the inverter during power-running operation is set to be identical with the electrical capacity of the press motor, and the electrical capacity of the converter during power-running operation is set to a value equal to or smaller than half of the electrical capacity of the press motor.

3. The power supply unit for a press machine as defined in claim 1, wherein the converter implements a regeneration operation.

4. The power supply unit for a press machine as defined in claim 1, further comprising:

a step-up circuit that boosts a DC voltage to be supplied to the electrical energy bank, the step-up circuit including reactors that are respectively provided in the AC phase current paths that connect the commercial AC power supply and the converter circuit, the converter circuit, and an ON/OFF drive control section that causes switching elements that form the converter circuit and correspond to respective phases to be turned ON/OFF in a predetermined order.

5. The power supply unit for a press machine as defined in claim 1, wherein the inrush prevention instruction signal generation section compares an expected DC voltage as the comparison reference voltage with the actual DC voltage, the expected DC voltage being a DC voltage expected to be output from the converter when an actual AC voltage detected from the AC current path is input to the converter.

6. The power supply unit for a press machine as defined in claim 1, wherein the power supply unit outputs a press stop instruction when power supplied from the commercial AC power supply is equal to or higher than a rated power handling capability of the inrush prevention resistors when the contactors of the inrush prevention circuit are in the OFF state.

7. The power supply unit for a press machine as defined in claim 1, wherein the power supply unit outputs a press stop instruction when power supplied from the commercial AC power supply is equal to or higher than a rated power handling capability of switching elements that form the converter circuit when the contactors of the inrush prevention circuit are in the ON state.

8. The power supply unit for a press machine as defined in claim 1, wherein the power supply unit outputs a press stop instruction when a DC voltage detected from the DC current path is equal to or lower than a predetermined operation continuation voltage.

9. A power supply unit for a press machine having a converter connected to a commercial AC power supply, and an inverter connected to a press motor, and generating and outputting a motor drive power for driving the press motor, an electrical capacity of the converter during power-running operation being smaller than an electrical capacity of the inverter during power-running operation, the converter being formed by a rectifier circuit, and the inverter being formed by an inverter circuit that implements a regeneration operation, and the power supply unit comprising:

an electrical energy bank that is provided in a DC current path and stores electrical energy, the DC current path connecting the rectifier circuit and the inverter circuit;

an inrush prevention circuit that includes inrush prevention resistors and contactors that are respectively connected in parallel to AC phase current paths that connect the commercial AC power supply and the rectifier circuit;

an inrush prevention instruction signal generation section that generates an inrush prevention instruction signal when a detected actual DC voltage of the DC current path is lower than a comparison reference voltage; and a contactor switch section that switches the contactors of the inrush prevention circuit from an ON state to an OFF state on condition that the inrush prevention instruction signal generation section has generated and output the inrush prevention instruction signal.

\* \* \* \* \*